D. E. BONNER.
FOLDING COVER, TOP, AWNING, AND THE LIKE.
APPLICATION FILED JAN. 6, 1914.
1,308,392.
Patented July 1, 1919.
2 SHEETS—SHEET 1.
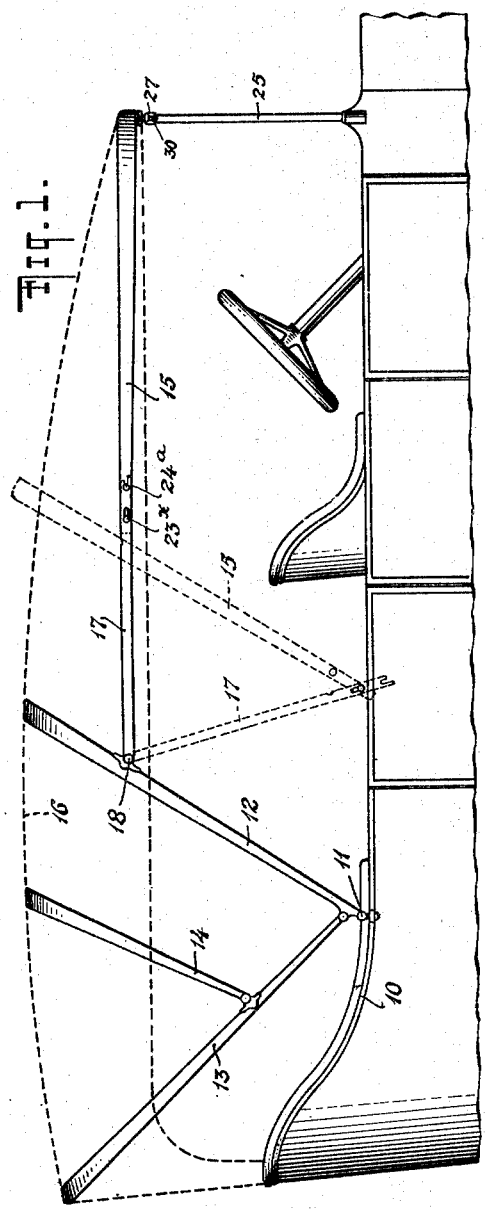
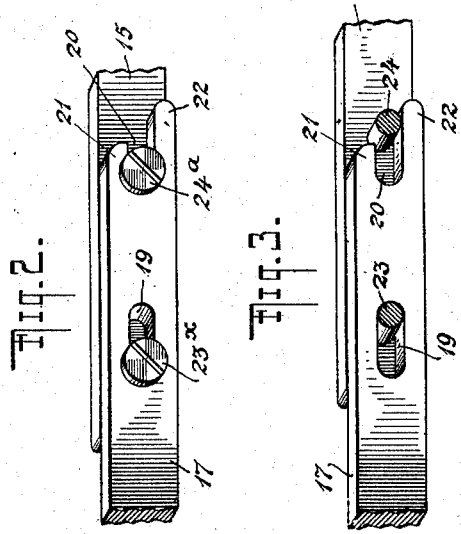
WITNESSES
INVENTOR
DOUGLAS E. BONNER
BY
Briesen & Knauth
ATTORNEYS D. E. BONNER.
FOLDING COVER, TOP, AWNING, AND THE LIKE.
APPLICATION FILED JAN. 6, 1914.
1,308,392.
Patented July 1, 1919.
2 SHEETS—SHEET 2.
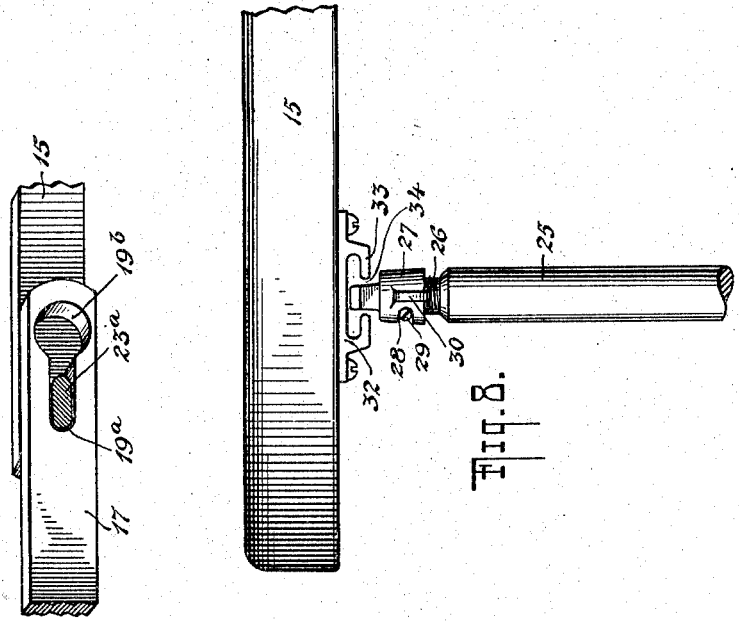
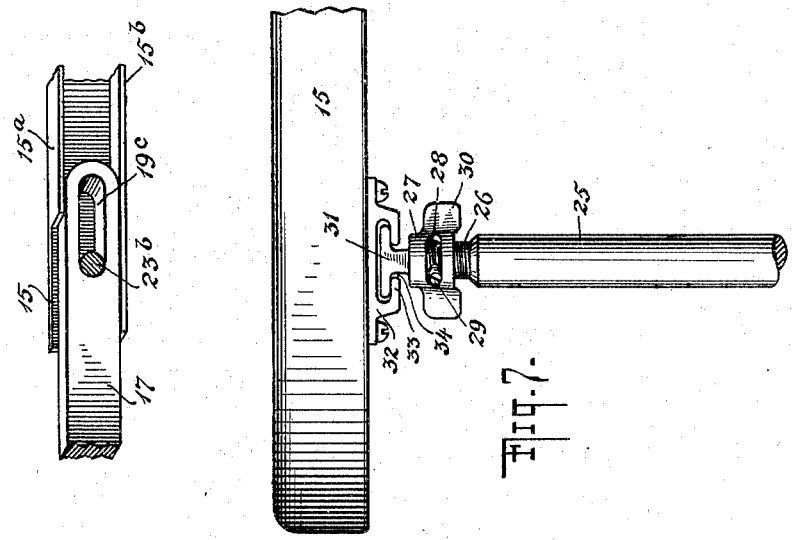
WITNESSES
INVENTOR
DOUGLAS E. BONNER
BY
ATTORNEYS

UNITED STATES PATENT OFFICE.

DOUGLAS E. BONNER, OF NEW YORK, N. Y.

FOLDING COVER, TOP, AWNING, AND THE LIKE.

1,308,392.   Specification of Letters Patent.   Patented July 1, 1919.

Application filed January 6, 1914.   Serial No. 810,576.

*To all whom it may concern:*

Be it known that I, DOUGLAS E. BONNER, a citizen of the United States, and resident of the borough of Manhattan, city, county, and State of New York, have invented certain new and useful Improvements in Folding Covers, Tops, Awnings, and the like, of which the following is a specification.

My invention relates to folding tops for vehicles, awnings or similar covers, and has for its object to provide a structure of these types which can be raised or lowered easily by one person and which is economical of manufacture and simple. My improvement also includes a joint or pivot which is capable of being locked and unlocked in a simple manner and which is securely fixed in its locked position against accidental or other disarrangement. My invention also comprises a novel means for securing the top, awning or cover in its extended position by attaching it to the object to which it is applied. A further object of my improvement is to construct said means in a manner to secure proper registration and coöperation of the parts at all times even if the relative positions thereof should change during use and so that none of the forward and backward strains, vibrations and shocks which may occur in the top, cover or awning will be transmitted to the supporting medium, for instance the wind shield of a vehicle. Other objects of my invention will appear from the description hereinafter and the features of novelty will be pointed out in the appended claims.

Referring to the accompanying drawings, Figure 1 shows a side elevation of my invention in its extended or unfolded condition, illustrated by way of example as a top for a vehicle; Figs. 2, 3 and 4 show detail views of my improved joint or pivot in different positions. Figs. 5 and 6 show detail views of different forms of said joint or pivot; Figs. 7 and 8 show in detail my improved attachment for holding the cover in an extended position.

Referring to Fig. 1, 10 is a vehicle body to which a top is pivoted at 11, said top comprising any desired number of hoops, bows or supports, such as 12, 13, 14, and 15, mounted in any convenient arrangement capable of being folded and unfolded, for instance as shown. 16 represents the usual covering material to which may be added reinforcing material and which is secured to the bows and the vehicle body in any customary manner. A strut or member 17 is pivoted at 18 to the main bow 12 and has its opposite end connected with the hoop or peak bow by means of my novel form of pivot described in detail hereinafter.

As shown in Figs. 1, 2, 3 and 4 the strut or member 17 is provided at one end with an elongated slot 19 and a notched portion or open ended recess 20 having a relatively short upper lip 21 and a relatively longer lower lip 22. The hoop or bow 15 is provided with a pivot pin or projection 23 which extends through the slot 20 and a second pin or projection 24 adapted to enter the open ended recess 21 of the member 17 both pins 23 and 24 being preferably constructed with nuts or heads $23^x$, $24^a$ respectively to secure the parts 15 and 17 against transverse separation.

In the extended position shown in Fig. 1 and in detail in Fig. 2 the pin 24 is located in the recess 20 beneath the lip 21 and the pin 23 is located at the inner end of the slot 19, the said pins 23 and 24 being maintained in this position by covering material 16 which is taut and under tension and consequently exerts a pull toward the rear of the vehicle. The coöperation of the pin 24 and lip 21, when the parts are in this position, thus prevent the bow 15 from swinging or turning on the pivot pin 23 or in other words prevents the pivotal connection between said strut or member 17 and the bow 15 from being broken. The said member 17 and bow 15 are consequently maintained as a substantially rigid unit and are prevented from assuming the position for instance as shown in dotted lines in Fig. 1.

To lower the top from the said extended position as shown in Fig. 1, the bow 15 is raised slightly, carrying with it member 17 which latter swings on pivot 18. This movement of bow 15 and member 17 slackens the covering material 16 and permits the bow 15 to be moved forward or slidably shifted relatively to the member 17 and carries the pins 23 and 24 forward in slot 19 and recess 20 respectively until pin 24 is free from the upper lip 21 of said recess 20 as shown in Fig. 3. The bow 15 and member 17 are now free to swing on the pivot pin 23 and to assume a folded position passing through a position as shown in dotted lines Fig. 1. Thereafter the bows 12, 13 and 14 may be lowered around pivot 11 as shown in Fig. 4 to a substantially horizontal position to completely fold the top, awning or cover.

To again extend the top or the like, the bows 12, 13 and 14 are first raised after which the member 17 and bow 15 are extended, the pins 23 and 24 being automatically returned to the position shown in Figs. 1 and 2 and maintained in this position by the tension of the covering material 16.

Fig. 5 shows a different form of pivotal connection between 15 and 17 in which the pivot pin 23$^a$ on the bow 15 is of elongated cross section as shown in the illustration. In this form the member 17 is provided with a slot 19$^a$ which terminates in an enlarged circular or other portion 19$^b$.

The slot 19$^a$ is of a width sufficient to receive and lock the elongated pin 23$^a$ only when the member 17 and bow 15 are substantially in line, whereas when the pin 23$^a$ is shifted to the enlarged part 19$^b$ of said slot 19$^a$ by a sliding movement of bow 15 relatively to the member 17, after the tension of the covering material has been released as before described, said pin 23$^a$ is free to turn completely around so that the top may be folded as described hereinbefore.

Fig. 6 shows another form of the pivotal connection. In this form the member 17 is provided with a closed slot 19$^c$ at one end for the accommodation of the pivot pin 23$^b$, and extends between flanges 15$^a$ and 15$^b$ of the bow 15, the latter in this case having substantially a U-shape in cross-section, and having the flange 15$^a$ made somewhat shorter than the flange 15$^b$, as clearly shown in said Fig. 6, although this is not absolutely necessary. In the position illustrated the tension of the covering material maintains the pin 23$^b$ at the rear end of the slot 19$^c$ so that the end of the member 17 is firmly held between the flanges 15$^a$ and 15$^b$ and the bow 15 consequently locked in its extended position. When it is desired to lower the top, the tension of the covering material 16 is released as in the two previous forms and the bow 15 is moved forward or slidably shifted relatively to the member 17 to move the pin 23$^b$ to the forward end of the slot 19$^c$. In this position the end of the member 17 will have been moved from beneath the flange 15$^a$ thus making it possible to break the connection and leaving the bow 15 free to be swung on the pin 23$^b$ and the top free to be folded.

In both of the forms last described the top is raised by a reverse operation of the parts, the pins 23$^a$ and 23$^b$ in each case being automatically moved to a position in the respective slots to securely lock the peak bow and members in extended position. It will readily be seen that various other forms of pivots might be employed in the same way.

The means for attaching the front portion of the top, when extended, to the vehicle or other object is shown in Fig. 1 and in detail in Figs. 7 and 8, which illustrate the hoop 15 looking from in front of the cover or at right angles to Fig. 1.

Referring to Figs. 7 and 8, 25 is a standard, or in the case of an automobile or other vehicle, a part of a windshield carried by the vehicle or other object to which the cover is applied, the upper end of which standard is preferably threaded as shown at 26. Upon this threaded end 26 is mounted an internally threaded member or cap 27 having a segmental slot 28 through which extends a stop pin 29 carried by the screw threaded portion 26 of standard 25. Finger pieces 30 may be attached to the member 27 at a point above the slot 28 by means of which said cap or member 27 may be manipulated or rotated on the screw-threaded portion 26 of the standard 25 for the purpose to be more clearly described hereinafter. The rotative movement of the cap or member 27 may be arrested at any desired point, this depending on the location of the pin 29. An angle piece 31 preferably T-shaped projects upwardly from the cap or member 27 and coöperates with a channel member 32 secured to the bow 15 at any suitable point to lock these parts together as will appear more clearly hereinafter. The said member 32 is formed with flanges 33 projecting toward each other and forming a transverse recess and an open ended slot 34 extending in a direction lengthwise of the cover when the latter is raised or extended and communicating with said recess. The slot 34 is arranged to extend in the said direction so that when the angle piece 31 and channel member 32 are connected, the latter is capable of a movement relatively to the said angle piece 31 in the direction of the length of the extended cover. With this arrangement any forward or backward strains, vibrations and shocks which may occur in the cover will simply cause a relative sliding movement between the member 32 and piece 31 and in consequence will not be transmitted to the wind shield or other element carrying the piece 31. The slot 34 is further arranged as described in order to accommodate any variations that may occur between the positions of standard 25 and bow 15 and to secure a proper registration thereof at all times. If necessary the position of the member 32 may be adjusted in a forward or backward direction to secure a proper coöperation of the parts.

Fig. 7 shows the attachment in position in which the cover or top is secured to the upright or standard 25. In this position the cross-members of the angle piece 31 are located above the flanges 33 at an angle to the slot 34 and the stem or upright member of said angle piece 31 is positioned in said slot 34 so that the bow 15 is securely locked to the standard 25 and separation thereof is prevented. The thread 26 on the standard 25 being a right-hand one, vertical vibration in the standard 25 or the cover and the upward strain on the said standard 25 produced by the tension of the covering material 16, tend to unscrew 27 from 26, this movement continuing until stopped by the pin 29 at a point when the cross-members or arms of the angle piece 31 are at right angles to the slot 34 and thus held against removal through said slot by the flanges 33. Hence it will be seen that the forces of vibration and the upward pull of the cover or covering material prevents the cap 27 from becoming disengaged from the angle piece 31.

When it is desired to disconnect the cover or top from the standard 25 the finger pieces 30 are rotated through 90° from the position shown in Fig. 7 to the position shown in Fig. 8, or until the cross-members of the angle piece 31 are in line or registry with the slot 34. In this position the said angle piece 31 may readily be disconnected from the channel member 32 and the top thus released from the standard 25 and folded or otherwise manipulated as may be desired.

With my improved construction it will readily be seen that the top or cover is easily manipulated either to be raised or lowered and is rigidly maintained in its extended or unfolded condition. As before stated, the standard 25 may comprise a separate element or may be incorporated as part of a windshield if the latter is present as in a vehicle, small boat or the like. It is of course to be understood that my improved joint connection may be used other than in combination with my attaching or securing device shown in Figs. 7 and 8 and similarly that said securing device may be combined with tops other than the particular forms shown and described.

Preferably I employ duplicate parts on each side of the vehicle or other object with which the top, awning or cover is combined.

It is obvious that many changes in detail and construction could be employed without departing from the spirit of my invention as defined in the claims and it is to be understood that I do not limit myself to the particular forms shown.

I could make changes such for instance as adding bows or hoops at various part of the structure.

My invention can be used for objects other than vehicle tops, such for instance as awnings or covers for any purpose or as a means to hinge and secure together various articles.

It will be understood that the location of the angle piece 31 and channel member 32 may be reversed under certain conditions, that is the angle piece may be carried by the bow 15, and the channel member may be secured to or form part of the standard 25 or windshield if the latter forms part of the structure in question. The flange 15$^a$ may be entirely omitted if this should be desired and in some both flanges 15$^a$ and 15$^b$ might terminate short of the inner end of the bow 15. In this latter case the joint could be broken in two directions. It is further to be understood that the various parts will be so constructed to provide for a complete folding of the top.

I claim:—

1. In a folding cover, the combination of a main bow, a strut pivoted thereto, a peak bow, a pivotal connection between said strut and peak bow carried by one of said last two elements and movable lengthwise of the other of said two elements, coöperating means on said strut and peak bow adapted in one position of the pivotal connection to lock said strut and peak bow together in an extended position and in another position of said pivotal connection to permit a pivotal folding movement thereof and a flexible covering connected with said main and peak bow, said covering in the raised position of the top being under tension and producing a compression strain in said strut and peak bow whereby said coöperating means are maintained in operative connection with each other.

2. In a folding cover, a strut provided with a slot having a reduced portion and an enlarged portion, a bow slidable lengthwise of said strut, and an angular projection carried by said bow and movable into the reduced portion of the slot to lock the strut and bow together and movable into the enlarged portion of said slot to permit a pivotal movement of the strut and bow.

3. The combination of a vehicle, a folding cover mounted thereon, a first member carried by the vehicle body, a second member carried by said cover, one of said members being formed with a recess having a reduced entrance end and the other member having a projection adapted to enter said recess and to be rotated therein to extend transversely across the entrance end of said recess whereby said members are detachably connected together and said cover is secured in its raised position.

4. The combination of a vehicle, a supporting element thereon, a folding cover mounted on said vehicle and having its one end contiguous to said supporting element in the raised position of said top and coöperating locking members on said supporting element and top respectively arranged to be secured together against separation in vertical directions whereby said one end of said top is connected with said supporting element to lock the top against collapse, said locking members, when operatively engaged, being freely movable relatively to each other in a horizontal direction without becoming disengaged to permit a relative vibration of said cover in directions transverse to said supporting element.

5. The combination of a vehicle, a folding cover therefor, one of said elements being provided with a transverse recess and an open slot communicating therewith and a locking member rotatably mounted on the other element and adapted in one position to coöperate with said recess to lock said cover in its extended position and in another position to be removable through said slot to disengage said cover and permit a folding thereof.

6. The combination of a vehicle, a folding cover therefor provided at its forward portion with a T-shaped slot, a rigid support on said vehicle or other object, a T-shaped projection rotatably mounted on said support and adapted to coöperate with said slot to lock said cover in its extended position and means for actuating said projection to bring it to its locking position in said slot and for moving it to a position to disconnect it from said slot to release said cover.

7. The combination of a vehicle, a folding cover mounted thereon and having its forward end contiguous to a substantially rigid portion of said vehicle in the raised position of the top and members on said portion of the vehicle and top respectively arranged to interlock against separation in vertical directions whereby said forward end of said top is connected with said vehicle portion to lock said top against collapse, said members, when interlocked, being slidable relatively to each other in directions transverse to the vertical whereby said top is capable of independent forward and backward vibration.

8. The combination of a vehicle, a cover carried by and extending over the same, a support, a socket carried by one of said last named elements, a projection rotatably mounted on the other element and adapted to enter said socket whereby the front end of the cover is secured in operative position, and means on said other element for limiting the rotary movement of said projection thereon.

9. The combination of a vehicle, a cover carried by and extending over the same, a T-shaped socket carried by said cover, an upright member on said vehicle having a screw-threaded portion, a cap in screw-threaded engagement with said screw-threaded portion and provided with a slot, a T-shaped projection carried by said cap adapted to be connected with and disconnected from said socket by rotating said cap, and a pin carried by said upright member and extending through the slot of said cap whereby a rotary movement of the latter on said member is arrested.

In testimony whereof, I have hereunto set my hand in the presence of two subscribing witnesses.

DOUGLAS E. BONNER.

Witnesses:
   JOHN A. KEHLENBECK,
   FRED A. KLEIN.

Copies of this patent may be obtained for five cents each, by addressing the "Commissioner of Patents, Washington, D. C."